United States Patent
Knaup et al.

(10) Patent No.: US 10,407,823 B2
(45) Date of Patent: Sep. 10, 2019

(54) COMPOSITION COMPRISING MIXTURES OF POLYACRYATES WITH FLUORINE-CONTAINING POLYACRYLATES

(71) Applicant: ARCHROMA IP GMBH, Reinach (CH)

(72) Inventors: Wolfgang Knaup, Burgkirchen (DE); Regina Brunnmaier, Burghausen (DE)

(73) Assignee: ARCHROMA IP GMBH, Reinach (CH)

( * ) Notice: Subject to any disclaimer, the term of this patent is extended or adjusted under 35 U.S.C. 154(b) by 348 days.

(21) Appl. No.: 15/323,350

(22) PCT Filed: Jul. 3, 2015

(86) PCT No.: PCT/EP2015/001371
§ 371 (c)(1),
(2) Date: Dec. 30, 2016

(87) PCT Pub. No.: WO2016/000829
PCT Pub. Date: Jan. 7, 2016

(65) Prior Publication Data
US 2017/0158850 A1    Jun. 8, 2017

(30) Foreign Application Priority Data

Jul. 4, 2014    (EP) .................................... 14002305

(51) Int. Cl.
| | |
|---|---|
| *D06M 13/02* | (2006.01) |
| *C08F 2/44* | (2006.01) |
| *C08F 220/18* | (2006.01) |
| *C08F 220/24* | (2006.01) |
| *C08L 33/16* | (2006.01) |
| *C09D 7/63* | (2018.01) |
| *C09D 5/00* | (2006.01) |
| *C09D 133/08* | (2006.01) |

(Continued)

(52) U.S. Cl.
CPC .............. *D06M 13/02* (2013.01); *C08F 2/44* (2013.01); *C08F 220/18* (2013.01); *C08F 220/24* (2013.01); *C08L 33/10* (2013.01); *C08L 33/16* (2013.01); *C08L 91/06* (2013.01); *C09D 4/00* (2013.01); *C09D 5/00* (2013.01); *C09D 7/63* (2018.01); *C09D 133/066* (2013.01); *C09D 133/068* (2013.01); *C09D 133/08* (2013.01); *C09D 133/12* (2013.01); *C09D 133/16* (2013.01); *C09D 191/06* (2013.01); *D06M 13/224* (2013.01); *D06M 15/248* (2013.01); *D06M 15/263* (2013.01); *D06M 15/273* (2013.01); *D06M 15/277* (2013.01); *D06M 15/29* (2013.01); *C08F 2220/1891* (2013.01); *C08K 5/01* (2013.01); *C08L 2203/12* (2013.01); *C08L 2205/025* (2013.01); *D06M 2101/06* (2013.01); *D06M 2101/32* (2013.01); *D06M 2200/01* (2013.01); *D06M 2200/11* (2013.01); *D06M 2200/12* (2013.01)

(58) Field of Classification Search
CPC ...... D06M 3/02; D06M 3/224; D06M 15/277; D06M 15/263; D06M 15/248; D06M 15/273; D06M 15/29; C08F 2/33; C08F 220/18; C08F 220/24; C08L 33/16; C08L 33/10; C08L 91/06; C09D 7/63; C09D 5/00; C09D 133/066; C09D 133/068; C09D 133/08; C09D 133/12; C09D 133/16; C09D 191/06; C09D 4/00
USPC .......................................................... 524/487
See application file for complete search history.

(56) References Cited

U.S. PATENT DOCUMENTS 3,459,696 A * 8/1969 Read ...................... C08F 220/24
524/512
3,533,977 A * 10/1970 Read ...................... C08F 220/24
524/315

(Continued)

FOREIGN PATENT DOCUMENTS

| CN | 1816575 A | 8/2006 |
|---|---|---|
| CN | 101283007 A | 10/2008 |

(Continued)

OTHER PUBLICATIONS

International Search Report for PCT/EP2015/001371 dated Jul. 23, 2015.

*Primary Examiner* — Michael Bernshteyn
(74) *Attorney, Agent, or Firm* — McBee Moore Woodward & Vanik IP, LLC

(57) ABSTRACT

Composition, comprising a first component (I) comprising a polyacrylate (A1) and a wax (B), and a second component (II) comprising a polyacrylate (A2), wherein polyacrylate (A1) comprises moieties derived from (meth)acrylic acid ester monomers (M1) and (M2), and optionally (M3), $$CH_2=CR^3COO-R^1 \quad (M1)$$
$$CH_2=CR^3COO-R^2 \quad (M2)$$
$$CH_2=CR^3-X-R^4; \quad (M3)$$

wherein $R^1$ is the alcohol moiety in monomer (M1) containing from 1 to 8 carbon atoms;
$R^2$ is the alcohol moiety in monomer (M2) containing from 9 to 40 carbon atoms;
$R^3$ is H, $CH_3$, or $C_2H_5$;
X is COO or CONH;
$R^4$ is glycidyl or $CH_2(CH_2)_n-OR^5$, wherein n is an integer in the range of from 1-10 and
$R^5$ is H or a residue containing from 1 to 6 carbon atoms; and
polyacrylate (A2) is a fluorine-containing polyacrylate;

(Continued)

wherein the composition is based on water and/or an organic solvent.

21 Claims, No Drawings

(51) Int. Cl.

| | | |
|---|---|---|
| C09D 133/12 | (2006.01) | |
| C09D 133/16 | (2006.01) | |
| C08L 91/06 | (2006.01) | |
| C09D 133/06 | (2006.01) | |
| D06M 15/277 | (2006.01) | |
| C08L 33/10 | (2006.01) | |
| D06M 15/263 | (2006.01) | |
| C09D 4/00 | (2006.01) | |
| C09D 191/06 | (2006.01) | |
| D06M 13/224 | (2006.01) | |
| D06M 15/248 | (2006.01) | |
| D06M 15/273 | (2006.01) | |
| D06M 15/29 | (2006.01) | |
| C08K 5/01 | (2006.01) | |
| D06M 101/06 | (2006.01) | |
| D06M 101/32 | (2006.01) | |

(56) References Cited

U.S. PATENT DOCUMENTS

| 2004/0102114 A1* | 5/2004 | Boylan ............... C08L 31/02 442/86 |
|---|---|---|
| 2005/0027063 A1 | 2/2005 | Audenaert et al. |
| 2007/0009663 A1* | 1/2007 | Wang ............... C08F 214/06 427/372.2 |

FOREIGN PATENT DOCUMENTS

| CN | 102493193 A | 6/2012 |
|---|---|---|
| CN | 102675527 A | 9/2012 |
| CN | 103524670 A | 1/2014 |
| GB | 1 058 955 A | 2/1967 |
| JP | 2009-500494 A | 1/2009 |
| JP | 2014-001252 A | 1/2014 |
| NL | 6 608 665 A | 9/1966 |
| NL | 6608665 A | 9/1966 |
| WO | 2007/008416 A1 | 1/2007 |

* cited by examiner

COMPOSITION COMPRISING MIXTURES OF POLYACRYATES WITH FLUORINE-CONTAINING POLYACRYLATES

CROSS REFERENCE TO RELATED APPLICATIONS

This application is a § 371 National State Application of PCT/EP2015/001371, filed Jul. 3, 2015, which claims priority to European Application No. 14002305.2 filed Jul. 4, 2014.

FIELD OF THE INVENTION

The invention relates to a composition containing a first component comprising a polyacrylate made from two different (meth)acrylic acid esters, and paraffin wax, and optionally further ingredients selected from blocked isocyanates, polysiloxanes and melamine resins, and further containing a second component comprising a fluorine-containing polyacrylate, a method of making such a composition, to a method of treating a substrate such as a textile with such composition in order to impart water-, oil- and soil-repellent properties to such substrate, and said treated substrate as such.

BACKGROUND OF THE INVENTION

It is known to treat textile fabrics such as wovens, knits or nonwovens with aqueous dispersions in order to provide them with desirable properties. Such a desired property is, for example, a water-repellent effect, i.e. a hydrophobic effect. Aqueous dispersions of fluorine-containing products may be used in order to obtain water-, oil- and soil-repellent properties for textiles.

EP 1 899 391 relates to aqueous dispersions produced by mixing an extender composition with a fluorinated dispersion to impart oil-, soil- and water-repellency and further surface effects.

EP 1 485 533 relates to preparations based on water and/or organic solvents and use thereof as coating on textile fabrics. The preparations may contain reaction products containing trifluoromethyl groups.

EP 1 424 433 relates to waterborne hydrophobic barrier coatings derived from copolymers of higher vinyl esters. The coatings may contain a fluorine-containing surfactant.

US 2007/0009663 relates to a polymer extender composition which may be blended with fluoropolymers in order to provide surface effects to treated substrates.

EP 1 595 932 relates to a water- and oil-repellent aqueous composition comprising a fluorinated water- and oil-repellent (A), an emulsified product (B) comprising a paraffin wax such as a paraffin wax having a melting point of from 50 to 70° C. and a penetration hardness at 25° C. of at most 20, and a carboxyl group-containing polyethylene such as a carboxyl group-containing polyethylene having a melting point of from 90 to 135° C. and an acid value of from 10 to 30 mg KOH/g, and an organic acid (C).

EP 2 430 713 relates to an aqueous composition and comprises at least components of A-C, where the component A is either a mixture which contains at least the components of A1 to A3 in which the component A1 is paraffin wax; the component B is a mixture which contains at least the components B1 to B3 in which the component B1 is an isocyanate group-containing polyurethane, the component B2 is a dispersant or its mixture and contains ethoxylated alcohols and optionally a divalent aliphatic alcohol and an inorganic acid, the component B3 is water; and the component C is a polymer that contains perfluoroalkyl $R_F$ groups. An aqueous composition comprises at least components of A to C, where component A is either a mixture which contains at least the components of A1 to A3, in which the component A1 is paraffin wax, the component A2 is a condensation product of 12 to 22C alcohol, an etherified, preferably quaternized polymethylol-melamine and optionally a polyhydric ethanolamine, which 0.05 to 1.5 wt. % of an acid, preferably acetic acid is contained, and the component A3 is water or the component A is a mixture that contains at least the components A4 to -A6, and the component A4 is a polysiloxane, which in addition alkyl groups bonded to silicon atoms contain hydrogen atoms bonded to silicon atom, and an alkyl hydrogen polysiloxane, where the component A5 is water, and the component A6 is a dispersant, preferably an ethoxylated alcohol or a mixture of ethoxylated alcohols, where preferably ethoxylated linear or branched alcohols are used with 8 to 20 carbon atoms; the component B is a mixture which contains at least the components B1 to B3, in which the component B1 is an isocyanate group-containing polyurethane, whose isocyanate groups are blocked, preferably with an aliphatic ketone oxime; the polyurethane is constructed preferably from an aromatic or aliphatic, preferably an aromatic diisocyanate; and the diisocyanate preferably with 2 to 6C diol is reacted to a trivalent aliphatic alcohol and an N-alkylated diethanolamine or triethanolamine; the component B2 is a dispersant or its mixture and contains ethoxylated alcohols and optionally a divalent aliphatic alcohol and optionally an inorganic acid; the component B3 is water; the component C is a polymer that contains perfluoroalkyl ($R_F$) groups, where 55 to 100% of all the present RF-group containing 6 carbon atoms; and the composition contains optionally a zirconium salt, preferably zirconium acetate, as component D. Textile flat structures made of fiber materials may be treated with the composition.

EP 1 629 149 relates to preparations based on water and/or organic solvents, and the use thereof as a finish on planar structures. Said preparations contain (1) 10 to 90 percent by weight of a fluoride-containing oil-repellent and water-repellent agent, (2) 10 to 80 percent by weight of a hydrophobic reaction product (S) that is obtained by reacting a component (A) with an unblocked or partly blocked diisocyanate, triisocyanate, or polyisocyanate (IC), (3) 0 to 45 percent by weight of an unblocked or blocked diisocyanate, triisocyanate, or polyisocyanate, and (4) optional common emulsifiers. The preparations provide the treated planar structures with permanent oil-repellent and water-repellent properties and a soft touch when used as a finish.

OBJECT OF THE INVENTION

There is an ongoing need in the industry for developing new water-repellent compositions which impart durable water-repellent properties to substrates such as textiles.

SUMMARY OF THE INVENTION

This object is achieved with a composition comprising at least a first component (I) and a second component (II), wherein the first component (I) comprises a polyacrylate (A1) and a wax (B), and the second component (II) comprises a fluorine-containing polyacrylate (A2), preferably a polyacrylate derived from an acrylate which contains perfluoroalkyl groups. The first component (I) is made from at least polyacrylate (A1) and wax (B), wherein polyacrylate (A1) is a polyacrylate made by polymerising two different (meth)acrylates, preferably in water and/or an organic solvent.

Accordingly, in a first aspect, the invention relates to a composition, comprising at least a first component (I) and a second component (II), wherein the first component (I) comprises a polyacrylate (A1) and a wax (B), and the second component (II) comprises a polyacrylate (A2), wherein polyacrylate (A1) comprises moieties derived from (meth) acrylic acid ester monomers (M1) and (M2), and optionally (M3):

$$CH_2=CR^3COO-R^1 \quad (M1)$$

$$CH_2=CR^3COO-R^2 \quad (M2)$$

$$CH_2=CR^3-X-R^4; \quad (M3)$$

wherein $R^1$ is the alcohol moiety in monomer (M1) containing from 1 to 8 carbon atoms;
$R^2$ is the alcohol moiety in monomer (M2) containing from 9 to 40 carbon atoms;
$R^3$ is independently selected from H, $CH_3$, or $C_2H_5$;
X is COO or CONH;
$R^4$ is glycidyl or $CH_2(CH_2)_n-OR^5$, wherein n is an integer in the range of from 1 to 10 and $R^5$ is H or a residue containing from 1 to 6 carbon atoms;
and
polyacrylate (A2) is a fluorine-containing polyacrylate;
wherein the composition is based on water and/or an organic solvent.

In one embodiment, component (I) comprises at least polyacrylate (A1) and wax (B) and optionally at least one of (C) to (E), wherein:
(A1) is obtained in the polymerisation of monomers (M1) and (M2) and optionally (M3);
(C) is a blocked isocyanate;
(D) is an organic polysiloxane;
(E) is a melamine resin.

In one embodiment, $R^1$ contains from 1 to 6 carbon atoms and $R^2$ contains from 12 to 40 carbon atoms.

In one embodiment, $R^1$ is branched or unbranched or cyclic $C_1$ to $C_6$ alkyl and $R^2$ is branched or unbranched or cyclic $C_{12}$ to $C_{40}$ alkyl.

In one embodiment, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl; and $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, polyacrylate (A1) is obtained in the polymerization of 5 to 45% by weight of monomer (M1) with 55 to 95% by weight of monomer (M2) based on the total amount of (A1) (=100% by weight).

In one embodiment, polyacrylate (A1) is obtained in the polymerization of 5 to 44% by weight of monomer (M1) with 55 to 94% by weight of monomer (M2) and 0.1 to 20% by weight of (M3) based on the total amount of (A1) (=100% by weight).

In one embodiment, wax (B) has a melting point in the range of from 50 to 130° C. or from 60 to 90° C.

In one embodiment, wax (B) is a paraffin wax.

In one embodiment, the first component (I) comprises from
10 to 90% by weight of (A1);
10 to 90% by weight of (B);
0 to 40% by weight of (C);
0 to 40% by weight of (D);
0 to 40% by weight of (E);
based on the total amount of the first component (I) (=100% by weight); and the second component (II) comprises from 10 to 100% by weight of (A2) based on the total amount of the second component (II).

In one embodiment, polyacrylate (A2) of the second component (II) comprises moieties derived from (meth) acrylic acid ester monomer (M4):

$$CH_2=CR^6COO-Y-R_F, \text{ wherein} \quad (M4)$$

$R_F-Y$ is the alcohol moiety in (meth)acrylate monomer (M4), wherein
Y is $-(CH_2)_m-$, wherein m is an integer in the range of from 1 to 10; and
$R_F$ is $C_xF_{2x+1}$, wherein x is an integer in the range of from 1 to 12, preferably 1 to 6, more preferred 4 to 6;
$R^6$ is selected from H, $CH_3$, Cl, or F.

In one embodiment, polyacrylate (A2) is obtained in the polymerization of monomer (M4) $CH_2=CR^6COO-Y-R_F$.

In one embodiment, polyacrylate (A2) is obtained in the polymerization of monomer (M4) with at least one of monomers (M1), (M2), (M3), (V1) and (V2), wherein (V1) is vinyl chloride and (V2) is vinylidene chloride.

In one embodiment, the composition comprises from 5 to 90% by weight of the first component (I) and from 90 to 5% by weight of the second component (II), based on the total weight of the composition (=100% by weight).

In another embodiment, the composition according to the invention comprises from 10 to 90% by weight of first component (I) and 90 to 10% by weight of second component (II), based on the total amount of components (I) and (II) (=100% by weight).

In one embodiment, the solids content of the composition is in the range of from 1 to 60% by weight based on the total weight of the composition (=100% by weight).

According to a second aspect, the invention relates to a method of making a composition as defined in any one of the preceding claims, comprising at least step (C3):
(C3) mixing the first component (I) with the second component (II).

In one embodiment, the method further comprises at least steps (C1) and (C2) prior to step (C3):
(C1) homogenizing a mixture comprising at least monomers (M1) and (M2), and wax (B), and water and/or an organic solvent;
(C2) polymerizing the mixture obtained in step (C1) to afford the first component (I).

According to a third aspect, the invention relates to a method of treating a substrate, comprising at least step (S1):
(S1) contacting a substrate with the composition defined in the first aspect, or contacting a substrate with the composition made according to the method defined in the second aspect.

In one embodiment, the substrate is in the form of a linear formation such as thread and yarn, in the form of a planar formation such as fabric, knitted fabric, knotted fabric, non-woven fabric, felt, or in the form of a spatial formation such as hose and outwear for women, men and children; or wherein the substrate is a textile, fiber, fabric, paper, non-woven, leather, or a combination of two or more thereof.

According to a fourth aspect, the invention relates to a substrate, comprising at least polyacrylate (A1), wax (B) and polyacrylate (A2) as defined in the first aspect.

In one embodiment, the substrate is or has been treated treated by the method of defined in the third aspect.

In one embodiment, the substrate is in the form of a linear formation such as thread and yarn, in the form of a planar formation such as fabric, knitted fabric, knotted fabric, non-woven fabric, felt, or in the form of a spatial formation such as hose and outwear for women, men and children; or wherein the substrate is a textile, fiber, fabric, paper, non-woven, leather, or a combination of two or more thereof.

According to a fourth aspect, the invention relates to the use of a composition as defined in the first aspect in or as a finishing for any textile in the form of a linear formation such as thread and yarn, in the form of a planar formation such as fabric, knitted fabric, knotted fabric, non-woven fabric, felt, or in the form of a spatial formation such as hose and outwear for women, men and children.

The invention further relates to the use of a wax which comprises or consists of n-paraffins in an amount of from 75 to 95% by weight and one or more of isoparaffins, cycloparaffins or aromatic compounds in an amount of from 5 to 25% by weight, based on the total amount of the wax, wherein the n-paraffins have from 20 to 60 carbon atoms, preferably wherein the n-paraffins have a molecular weight of from 300 to 600; in or as a finishing for any textile in the form of a linear formation such as thread and yarn, in the form of a planar formation such as fabric, knitted fabric, knotted fabric, non-woven fabric, felt, or in the form of a spatial formation such as hose and outwear for women, men and children.

DETAILED DESCRIPTION OF THE INVENTION

The following terms in quotation marks are defined in the meaning of the invention. E.g., the term "(meth)acrylate" encompasses both acrylate and methacrylate.

First Aspect: Composition According to the Invention

The invention relates to a composition, comprising at least two different components, i.e. a first component (I) and a second component (II). The first component is based on a polyacrylate (A1) and a wax (B), and the second component is based on a fluorine-containing polyacrylate (A2).

First Component (I)

The first component (I) comprises at least polyacrylate (A1) and wax (B) and optionally at least one of (C) to (E):
(A1) a polyacrylate obtained in the polymerisation of monomers $$CH_2=CR^3COO-R^1 \text{ with} \qquad (M1)$$

$$CH_2=CR^3COO-R^2 \text{ and optionally} \qquad (M2)$$

$$CH_2=CR^3-X-R^4; \qquad (M3)$$

(B) a wax;
(C) a blocked isocyanate;
(D) an organic polysiloxane;
(E) a melamine resin;

wherein
$R^1$ is a residue containing from 1 to 8 carbon atoms;
$R^2$ is a residue containing from 9 to 40 carbon atoms;
$R^3$ is independently selected from H, $CH_3$, or $C_2H_5$;
X is COO or CONH;
$R^4$ is glycidyl or $CH_2(CH_2)_n-OR^5$, wherein n is an integer in the range of from 1 to 10 and $R^5$ is H or a residue containing from 1 to 6 carbon atoms.

Polyacrylate (A1)

Polyacrylate (A1) is the reaction product obtained in a polymerization reaction of monomer (M1) with monomer (M2). Optionally, a monomer (M3) may be additionally employed to monomers (M1) and (M2).

The term "polyacrylate (A1) is the reaction product obtained in a polymerization reaction of monomer (M1) with monomer (M2) and optionally monomer (M3)" means that polyacrylate (A1) comprises or consists of moieties derived from monomer (M1) and monomer (M2) and optionally monomer (M3).

Monomers (M1) and (M2) are acrylic acid esters which are different from one another. The term "different from one another" means that (M1) and (M2) differ at least in the constitution of the ester moiety of the monomers.

Monomer (M1)

According to the invention, monomer (M1) is an acrylic acid ester $CH_2=CR^3COO-R^1$ wherein $R^1$ represents a residue containing from 1 to 8 carbon atoms. $R^3$ is selected from the group consisting of H, $CH_3$, or $C_2H_5$.

The term "residue" as used in the definition of any monomer defined therein such as monomer (M1) [or monomer (M2) or (M3) or (M4)] denotes the alcohol moiety of the ester or monomer (M1) (or the other respective monomer).

In one embodiment, $R^1$ is a branched or unbranched or cyclic $C_1$-$C_8$ alkyl group that may be saturated or unsaturated.

Preferably, $R^1$ is selected from the group consisting of methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof, cyclopropyl, cyclobutyl, cyclopentyl, cyclohexyl, cycloheptyl and cyclooctyl.

Mixtures of different monomers (M1) may also be employed.

The term "isomer" in connection with $R^1$ encompasses positional isomers.

In one embodiment, $R^1$ represents a residue, i.e. the alcohol moiety of the ester, containing from 1 to 6 carbon atoms.

In one embodiment, $R^1$ is a branched or unbranched or cyclic $C_1$ to $C_6$ alkyl group that may be saturated or unsaturated.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl.

Monomer (M2)

According to the invention, monomer (M2) is an acrylic acid ester $CH_2=CR^3COO-R^2$ wherein $R^2$ represents a residue, i.e. the alcohol moiety of the ester, containing from 9 to 40 carbon atoms. $R^3$ is selected from the group consisting of H, $CH_3$, or $C_2H_5$.

In one embodiment, $R^2$ is a branched or unbranched or cyclic $C_9$ to $C_{40}$ alkyl group that may be saturated or unsaturated.

Preferably, $R^2$ is selected form the group consisting of n-nonyl and isomers thereof, n-decyl and isomers thereof, n-undecyl and isomers thereof, n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

Mixtures of different monomers (M2) may also be employed.

The term "isomers" in connection with $R^2$ encompasses positional isomers.

In one embodiment, $R^2$ represents a residue, i.e. the alcohol moiety of the ester, containing from 12 to 40 carbon atoms.

In one embodiment, $R^2$ is a branched or unbranched or cyclic $C_{12}$ to $C_{40}$ alkyl group that may be saturated or unsaturated.

Preferably, $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$ to $C_6$ alkyl group and $R^2$ is a branched or unbranched or cyclic $C_{12}$ to $C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl, and $R^2$ is selected from the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$ to $C_5$ alkyl group and $R^2$ is a branched or unbranched or cyclic $C_{14}$ to $C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, cyclopropyl, cyclobutyl, cyclopentyl, and $R^2$ is selected from the group consisting of n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

Polyacrylate (A1) is preferably obtained in the reaction of 5 to 45% by weight of monomer (M1) with 55 to 95% by weight of monomer (M2) based on the total amount of (A1) (=100% by weight); or 20 to 40% by weight of monomer (M1) with 60 to 80% by weight of monomer (M2) based on the total amount of (A1) (=100% by weight).

Monomer (M3)

According to the invention, the composition may be prepared in the presence of monomer (M3) which is monomer $CH_2=CR^3-X-R^4$.

In one embodiment, monomer (M3) is the glycidylester of an acrylic acid (X=COO and $R^4$=glycidyl).

In another embodiment, monomer (M3) is an ester of an acrylic acid, wherein the ester moiety bears an ether group (X=COO and $R^4=CH_2(CH_2)_n-OR^5$), wherein n is an integer in the range of from 1 to 10 and $R^5$ is H or a residue containing from 1 to 6 carbon atoms, preferably a branched or unbranched or cyclic alkyl. Preferably, n ranges from 1 to 4 and $R^5$ is H or a residue containing from 1 to 4 carbon atoms, preferably a branched or unbranched or cyclic alkyl.

In a preferred embodiment, if $R^4=CH_2(CH_2)_n-OR^5$, n is an integer in the range of from 1 to 4 and $R^5$ is H or n-butyl or iso-butyl.

In one embodiment, monomer (M3) is hydroxyethyl (meth)acrylate.

In another embodiment, monomer (M3) is the glycidylester of an acrylic acid amide (X=CONH and $R^4$=glycidyl).

In another embodiment, monomer (M3) is an ester of an acrylic acid amide, wherein the ester moiety bears an ether group (X=CONH and $R^4=CH_2(CH_2)_n-OR^5$ wherein n is an integer in the range of from 1 to 10 and $R^5$ is H or a residue containing from 1 to 6 carbon atoms, preferably branched or unbranched or cyclic alkyl. Preferably, n ranges from 1 to 4 and $R^5$ is H or a residue containing from 1 to 4 carbon atoms, preferably branched or unbranched or cyclic alkyl.

Mixtures of different monomers (M3) may also be employed.

In a preferred embodiment of the acrylic ester or the acrylic acid amide, if $R^4=CH_2(CH_2)_n-OR^5$, n is an integer in the range of from 1 to 4 and $R^5$ is H or n-butyl or iso-butyl.

Monomers (M3) bearing a glycidyl group may impart an increased adhesion to substrates bearing groups which may react with said glycidyl group such as hydroxyl or amino groups.

If monomer (M3) is present, (A1) is preferably obtained in the reaction of 5 to 44% by weight of (M1) with 55 to 94% by weight of (M2) and 0.1 to 20% by weight of (M3) based on the total amount of (A1) (=100% by weight).

Wax (B)

According to the invention, (B) is a wax, preferably a wax having hydrophobic properties such as water-repellent properties.

Basically all known waxes may be employed in the composition according to the invention, i.e. natural waxes, chemically modified waxes and synthetic waxes, provided that they have hydrophobic properties. The term "wax" as used herein refers to the definition given in the publication "Römpp Chemielexikon, 9$^{th}$ edition, vol. 6, page 4972.

Accordingly, natural waxes may be based on vegetable waxes, animal waxes mineral waxes, petrochemical waxes.

A vegetable wax is e.g. carnauba wax, and an animal wax is e.g. bees wax.

A mineral wax is e.g. ceresin.

Petrochemical waxes may also be used such as petrolatum, paraffin waxes and microwaxes.

Chemically modified waxes are waxes such as montane ester waxes and sasol waxes.

Synthetic waxes are waxes based on polyalkylene and polyethylene glycol.

In a preferred embodiment, the wax is selected such to have a melting point in the range of from 50 to 100° C., more preferred 60 to 90° C., still more preferred 60 to 80° C. The melting point is determined according to ASTM D 938-05/DIN ISO 2207:1983.

Compositions according to the invention comprising waxes having a lower melting range than 50° C. are sometimes less suitable for imparting water-repellency to the textiles to be treated with the aqueous dispersions according to the invention. Waxes with a melting range higher above 100° C. may result in an acceptable water repellence and resistance to washing of the fabrics, but they may give rise to increased viscosity of the aqueous dispersions, so that these dispersions are technically less easy to handle. Therefore, basically, waxes having a melting point in the range of from 100 to 130° C. are also suitable in the composition according to the invention.

Thus, in general, the melting point of the wax according to ingredient (B) may range from 50 to 130° C.

Preferably, the wax is a paraffin wax.

The paraffin wax is a mixture containing n-paraffins having from 20 to 60 carbon atoms as the main component and containing small amount of isoparaffins, and/or cycloparaffins and/or aromatic compounds. The n-paraffins preferably have a molecular weight of from 300 to 600.

The molecular weight is determined using gel-permeation chromatography. The distribution of n-paraffins, isoparaffins, cycloparaffins and aromatic compounds may be determined using $^{13}$C NMR spectroscopy.

In one embodiment, the wax comprises or consists of n-paraffins in an amount of from 75 to 95% by weight and one or more of isoparaffins, cycloparaffins or aromatic compounds in an amount of from 5 to 25% by weight, based on the total amount of the wax (=100% by weight).

E.g., a paraffin wax with a melting range of 68° C. to 74° C. is commercially available (CAS No. 8002-74-2).

Such suitable waxes are commercial available, e.g. Sasolwax 8775, Sasolwax 7040, Sasolwax 3971, Sasolwax 6805, or Sasolwax 2222.

In one embodiment, more than one wax (B) may be employed.

Blocked Isocyanate (C) (Optional)

According to the invention, component (I) may optionally contain a blocked or partially blocked isocyanate (C) in the composition.

The term "blocked isocyanate" encompasses mono-, di- and polyisocyanates in which an isocyanate group has been reacted with blocking agents which upon heating release the isocyanate and the blocking agent. Suitable blocking agents are known in the art such as amines, amides, compounds having an active hydrogen atom or alcohols. If said heating is carried out in the presence of a compound having a functional group that can react with said isocyanate group, such as a hydroxyl or an amino group of a suitable substrate such as a fiber, an improved adhesion may result.

Accordingly, blocked isocyanates, in particular blocked polyisocyanates, present in the composition according to the invention, may impart an increased adhesion to substrates bearing groups such as amine or hydroxyl groups which may react with said blocked isocyanate.

Ingredient (C) may be present in an amount of from 0 to 40% by weight based on the total amount of component (I) (=100% by weight) in the composition.

Such suitable blocked isocyanates are commercial available such like Arkophob DAN, Arkophob SR, and Cassurit FF (all Archroma); Phobol XAN (Huntsman) and Ruco-Guard WEB (Rudolf).

Organic Polysiloxane (D) (Optional)

According to the invention, component (I) may optionally contain an organic polysiloxane resin (D).

The term "organic polysiloxane" encompasses a compound, in which at least a part of the silicon atoms bears alkyl or aryl groups which in turn may be substituted. The polysiloxane may be cyclic, linear or branched.

Any organic polysiloxane resin known in the art for providing water-repellency to a substrate may be used. Suitable products are e.g. known from DE 10 2013 209 170 and EP 2 152 957.

Polysiloxane (D) may be present in an amount of from 0 to 40% by weight based on the total amount of the component (I) (=100% by weight) in the composition.

Such polysiloxane formulations are commercial available such like Ceraperm SFC (Archroma), Powersoft FE 55 or Wacker Finish WR 210 (both Wacker Chemie, Germany).

Melamine Resin (E) (Optional)

According to the invention, the component (I) may optionally contain a melamine resin (E).

Suitable melamine resins are e.g. resins in which the hydrogen atoms of the amino groups of the melamine moiety are partially or completely substituted by $CH_2O$-alkyl or $CH_2O_2C$-alkyl groups. Such products are known from U.S. Pat. No. 3,480,579.

Further suitable melamine resins are resins in which the hydrogen atoms of the amino groups of the melamine moiety are partially or completely substituted by saturated or unsaturated, linear, branched and/or cyclic hydrocarbons. Such products are known e.g. from DE 10 2013 209 170.

Ingredient (E) may be present in an amount of from 0 to 40% by weight based on the total amount of component (I) (=100% by weight) in the composition.

Formulations that contain such suitable melamine resins are commercial available such like Cerol EX (Archroma) or Freepel 1225 (Emerald Performance Materials), or Phobotex JVA (Huntsman). Such melamine resins may include a paraffin wax such as component (B).

Ingredients (A) to (E) are known in the art or may be prepared according to known methods.

Polyacrylate (A1) may be prepared according to a method as defined in the second aspect of the invention.

The ingredients of component (I) typically are provided in water and/or an organic solvent such to form said component (I).

The term "ingredient" means a compound or a substance which is contained in the component (I) or (II).

Second Component (II)

The second component (II) comprises a fluorine-containing polyacrylate (A2), in particular a polyacrylate containing perfluoroalkyl groups.

Polyacrylate (A2)

In one embodiment, the polyacrylate (A2) is obtained in the polymerization of monomer (M4) $CH_2=CR^6COO-Y-R_F$, wherein $R_F-Y$ is the alcohol moiety in (meth)acrylate monomer (M4), wherein Y is $-(CH_2)_m-$, wherein m is an integer in the range of from 1 to 10; and $R_F$ is $C_xF_{2x+1}$, wherein x is an integer in the range of from 1 to 12, preferably 1 to 6, more preferably 4 to 6;

$R^6$ is selected from H, $CH_3$, Cl, or F.

In one embodiment, $C_xF_{2x+1}$ is branched.

In another embodiment, $C_xF_{2x+1}$ is unbranched.

In a preferred embodiment, $R_F$ is $C_xF_{2x+1}$ and x is 4, 5 or 6.

In a further preferred embodiment, $R_F$ is $C_xF_{2x+1}$ and x is 6.

The term "polyacrylate (A2) is obtained in the polymerization of monomer (M4)" means that polyacrylate (A2) comprises or consists of moieties derived from monomer (M4).

In another embodiment, polyacrylate (A2) is obtained in the polymerization of monomer (M4) with at least one of monomers (M1), (M2), (M3), (V1) and (V2), wherein (M1), (M2) and (M3) have the meaning defined with respect to component (I), and (V1) is vinyl chloride and (V2) is vinylidene chloride.

The term "polyacrylate (A2) is obtained in the polymerization of monomer (M4) with at least one of monomers (M1), (M2), (M3), (V1) and (V2)" means that polyacrylate (A2) comprises or consists of moieties derived from (meth)acrylic acid ester monomer (M4), and additionally one or more moieties derived from monomers (M1), (M2), (M3), (V1) and/or (V2).

In one embodiment, polyacrylate (A2) is a copolymer of monomer (M4) with at least one of (M1), (M2) or (M3), and (V1) or (V2).

In another embodiment, polyacrylate is a copolymer of monomer (M4) with at least one of (M1), (M2) or (M3).

In one embodiment, polyacrylate (A2) is a copolymer of 2-perfluorohexylethyl methacrylate $C_6F_{13}C_2H_4OCOC(CH_3)=CH_2$ with at least stearyl acrylate or stearyl methacrylate and vinyl chloride or vinylidene chloride.

In another embodiment, polyacrylate (A2) is a copolymer of 2-perfluorohexylethyl methacrylate with at least stearyl acrylate or stearyl methacrylate.

Polyacrylates (A2) are known, e.g. from WO 2008/022985 (EP 2 057 201), or may be prepared according to known methods. Typically, said polyacrylates (A2) are made in an emulsion polymerization according to known methods.

In one embodiment, besides polyacrylate (A2), component (II) may additionally contain a blocked isocyanate and/or an organic polysiloxane and/or a melamine resin as further ingredients, which may be the same or which may be different from those optionally used in component (I).

The ingredients of component (II) typically are provided in water and/or an organic solvent such to form said component (II).

Water and/or Organic Solvent

In one embodiment, the composition according to the invention is based on water and/or an organic solvent.

The term "based on water and/or an organic solvent" encompasses solutions, emulsions and dispersions of the solid and/or liquid compounds contained in the composition in water and/or an organic solvent. The terms "solutions", "emulsions" and "dispersions" are used interchangeably.

The term "water" encompasses distilled water as well as pipe water.

The term "organic solvent" preferably encompasses solvents which are miscible with water or partially water soluble. Preferred organic water miscible solvents are $C_{1-2}$ alcohols, glycols such as ethylene glycol and propylene glycol, dipropylene glycol or polyethylene glycols, amides such as N-methylformamide and N,N-dimethylformamide.

Partially water soluble solvents are also suitable. Preferred organic solvents are dipropylene glycol dimethylether, methoxy propyl acetate, methoxy butyl acetate (butoxyl), and methoxy methyl butyl acetate.

Preferably, the composition according to the invention is/are mainly based on water. The term "main/y" means that the amount of organic solvent is less than 50% by weight, based on the total weight of water and organic solvent (=100% by weight). In a preferred embodiment, the amount of organic solvent is less than 40% by weight; more preferred less than 30% by weight, still more preferred less than 20% by weight, still more preferred less than 10% by weight. In one embodiment, the composition does not contain an organic solvent.

The composition according to the invention may contain from 0.1 to 90% by weight water and/or an organic solvent based on the total amount of the composition (=100% by weight), respectively.

In one embodiment, the solids content of the composition in water and/or an organic solvent according to the invention is in the range of from 1 to 60% by weight or 10 to 50% by weight, preferably 20 to 40% by weight and still more preferred 25 to 35% by weight, based on the total weight of the composition (=100% by weight).

Furthermore, in one embodiment, the composition according to the invention may contain one or more of the following compounds which frequently are used for also imparting water-repellence to a substrate: N-methylol compounds such as N-methylol acrylic amides or melamine resins bearing N-methylol groups; chlorine-containing products in particular stemming from monomers such as vinyl chloride or vinylidene dichloride.

In one embodiment, the composition according to the invention comprises from 5 to 90% by weight of first component (I) and from 90 to 5% by weight of the second component (II), based on the total weight of the composition (=100% by weight).

In another embodiment, the composition according to the invention comprises from 10 to 90% by weight of first component (I) and 90 to 10% by weight of second component (II), based on the total amount of components (I) and (II) (=100% by weight).

Second Aspect: Preparation of the Composition According to the Invention

The composition according to the invention may be prepared by mixing first component (I) and second component (II) according to mixing methods which are known in the art, e.g. adding component (I) to component (II) or vice versa, and stirring same wherein a preferably homogeneous mixture is obtained.

Accordingly, the composition according to the invention may be prepared by a method comprising at least step (C3):
(C3) mixing component (I) with component (II).

In one embodiment, the method comprises at least steps (C1) and (C2) prior to step (C3):
(C1) homogenizing a mixture comprising at least monomers (M1) and (M2), and optionally wax (B), and water and/or an organic solvent;

(C2) polymerizing the mixture obtained in step (C1) to afford component (I).

In one embodiment, step (C2) comprises polymerizing monomers (M1) and (M2) and optionally (M3) in water and/or an organic solvent and admixing component (B).

If desired, one or more of (C) to (E) that are known as components of textile treatment compositions, may be added, preferably after the polymerization has been terminated.

In a preferred embodiment, component (I) may be prepared by polymerizing monomers (M1) and (M2) and optionally (M3) in water and/or an organic solvent in the presence of wax (B), preferably in an emulsion polymerization in water. If desired, one or more of (C) to (E) which are known as components of textile treatment compositions, may be added, preferably after the polymerization has been terminated.

In a preferred embodiment, prior to polymerization, a mixture of (M1) and (M2) and optionally (M3) and wax (B) in water and/or an organic solvent is homogenized. This method is exemplarily explained below:

The wax (B) and monomers (M1) and (M2) and optionally monomer (M3) are melted, preferably in the presence of a dispersant [as dispersant (F)]. The obtained mixture is dispersed in hot water, e.g. hot water at 85° C., by stirring, e.g. using a Turrax for example. This is followed by high-pressure homogenizing, for example at 400 bars and a temperature of from 80 to 85° C. For this, the obtained heated mixture may be passed through a nozzle or an orifice of a homogenizer. Suitable devices are known in the art. Subsequent to the homogenizing, the dispersion may be cooled down and a polymerization catalyst is added, preferably dispersed or dissolved in water: The dispersion may also be polymerized at elevated temperature such as 80° C. After several hours reaction time at e.g. 50° C. to 80° C., the polymerization is terminated.

Suitable dispersants (F) are known and can be selected from commercially available products such as nonionic surfactants, ethoxylated products, such as ethoxylated alcohols or ethoxylated carboxylic acids. Commercially available cationic-active products may be quaternary ammonium salts or mixtures with such cationic-active products and nonionic products such as mono- or dipropylene glycol. Further suitable dispersants are compounds with amphoteric structures e.g. with betaine and/or amine N-oxide functionalities.

Polyacrylate (A1) preferably contains from 0.1 to 3% by weight, preferably from 0.5 to 3% by weight of dispersant or dispersant mixture based on the total amount of polyacrylate (A1) (=100% by weight).

Usually, the copolymerization is carried out as free-radical copolymerization by using a polymerization catalyst. As catalysts for the radical polymerizations generally known commercial products are used, which serve as free-radical initiators. In the present invention, inter alia, azo compounds may be used as catalysts. A suitable catalyst is e.g. 2,2'-azobis(2-amidinopropane)dihydrochloride. Usually, the copolymerization is carried out as free-radical copolymerization by the amount of polymerization catalyst employed may be in the range of from 0.1 to 5% by weight, based on the mixture of the monomer (M1) and (M2) and optionally (M3) (=100% by weight), preferably 2.5 to 5% by weight.

Preferably, homogenization is performed at a pressure in the range of from 100 to 1,000 bars and a temperature in the range of 50 to 100° C., preferably by passing the mixture through a nozzle or an orifice.

Preferably, homogenization is performed at a pressure in the range of from 200 to 600 bars and a temperature in the range of from 60 to 90° C.

Suitable homogenizers are known in the art.

In one embodiment, component (I) and component (II) is/are based on water and/or an organic solvent.

According to the invention, the composition is based on water and/or an organic solvent.

The term "based on water and/or an organic solvent" encompasses solutions, emulsions and dispersions of the solid and/or liquid compounds contained in the composition in water and/or an organic solvent. The terms "solutions", "emulsions" and "dispersions" are used interchangeably.

The term "water" encompasses distilled water as well as pipe water.

The term "organic solvent" preferably encompasses solvents which are miscible with water or partially water soluble. Preferred organic water miscible solvents are $C_{1-2}$ alcohols, glycols such as ethylene glycol and propylene glycol, dipropylene glycol or polyethylene glycols, amides such as N-methylformamide and N, N-dimethylformamide.

Partially water soluble solvents are also suitable. Preferred organic solvents are dipropylene glycol dimethylether, methoxy propyl acetate, methoxy butyl acetate (butoxyl), and methoxy methyl butyl acetate.

Preferably, component (I) and/or component (II) and thus the composition according to the invention is/are mainly based on water. The term "mainly" means that the amount of organic solvent is less than 50% by weight, based on the total weight of water and organic solvent (=100% by weight). In a preferred embodiment, the amount of organic solvent is less than 40% by weight; more preferred less than 30% by weight, still more preferred less than 20% by weight, still more preferred less than 10% by weight. In one embodiment, the composition does not contain an organic solvent. In one embodiment, component (I) and/or component (II) are provided as dispersions in water and/or an organic solvent.

In one embodiment, prior to the mixing of components (I) and (II), component (I) comprises from
5 to 90% by weight of (A1);
5 to 90% by weight of (B);
0 to 40% by weight of (C);
0 to 40% by weight of (D);
0 to 40% by weight of (E);
0.1 to 90% by weight of water and/or an organic solvent;
based on the total weight of component (I) (=100% by weight).

In one embodiment, component (II) comprises from
10 to 90% by weight of (A2),
10 to 90% by weight of water and/or an organic solvent;
based on the total weight of component (II) (=100% by weight).

The composition according to the invention may contain from 0.1 to 90% by weight water and/or an organic solvent based on the total amount of the composition (=100% by weight).

In one embodiment, the composition according to the invention comprises from 5 to 90% by weight of the first component (I) and from 90 to 5% by weight of the second component (II), based on the total weight of the composition (=100% by weight), or from 10 to 80% by weight of the first component (I) and from 80 to 10% by weight of the second component (II), or from 70 to 15% by weight of the first component (I) and from 15 to 70% by weight of the second component (II).

In another embodiment, the composition comprises from 10 to 90% by weight of first component (I) and from 90 to 10% by weight of second component (II), based on the total amount of components (I) and (II) (=100% by weight), or from 15 to 85% by weight of first component (I) and from 85 to 15% by weight of second component (II), or from 20 to 80% by weight of first component (I) and from 80 to 20% by weight of second component (II).

Third Aspect: Use of the Composition According to the Invention

The composition according to the invention is particularly useful for imparting water-, oil- and/or soil-repellency to a substrate.

The term "water-repellency" defines the characteristic of a fiber, yarn or fabric to resist wetting as is defined in AATCC Test Method 11-2010.

The term "oil-repellency" defines the characteristic of a fiber, yarn or fabric to resist a hydrocarbon as defined in AATCC Test Method 118-2002.

The term "soil-repellency" defines the characteristic of a fiber, yarn or fabric to resist soil or release oil as defined in AATCC Test Method 130.

Accordingly, the invention relates to a method of treating a substrate comprising at least step (S1):
(S1) contacting a substrate with the composition defined in the first aspect, or made according to the method defined in the second aspect.

The term "treating a substrate" encompasses terms such as "finishing a substrate", "imparting hydrophobicity to a substrate", "making a substrate water-repellent", "making a substrate dirt resistant" or "coating a substrate".

The contacting of the substrate may be carried out by generally customary methods, such as dunking or dipping the substrate into the composition according to the invention, or by spraying the composition according to the invention onto a substrate, or by brush application or sponge application or via a forced application or by an extraction method. Subsequent to the contacting, the contacted substrate may be dried, and, where appropriate, cured at temperatures in the range of from 140° C. to 190° C. Excellent performance is also achievable at low or even ambient curing conditions, means at temperatures below 100° C. or even at temperatures as low as 50° C.

Preferably, the substrate is a textile, fiber, fabric, paper, nonwoven, leather, or a combination of two or more thereof.

The textiles are preferably made from cotton, polyester, or a cotton/polyester blend, from polyamides, polyimides, polyphenylene sulfide, aramide, polyvinyl chloride, polyacrylnitrile, polyvinyl acetate, polytetrafluoroethylene, polyethylene, polypropylene, polyurethane, elastane, carbon fibers, silicate fibers, glass fibers, basalt fibers, metal fibers, or mixtures of two or more thereof. The textiles are normally wovens, knits or non-wovens.

Accordingly, in general, the composition according to the invention may be used as a finish or finishing for substrates such as textile fabric. Preferably, the substrates are provided in the form of a linear, a planar formation or a spatial formation.

The term "finish or finishing" encompasses a composition by means of which water-repellency may be imparted to a substrate. The finishing may be applied to the substrate before or after washing the substrate.

In one embodiment, the composition according to the invention may be used in or as finishing for any textile (=substrate). The textile may be in the form of a linear formation such as threads and yarns, in the form of a planar formation such as fabric, knitted fabric, knotted fabric, non-woven fabric, felts, and in the form of a spatial formation such as hoses and outwear for women, men and children.

In one embodiment, the invention relates to the use of a wax which comprises or consists of a n-paraffin in an amount of from 75 to 95% by weight and an isoparaffin, and/or a cycloparaffin and/or an aromatic compound in an amount of from 5 to 25% by weight based on the total amount of the wax, wherein the n-paraffin has from 20 to 60 carbon atoms, preferably wherein the n-paraffin has a molecular weight of from 300 to 600, in or as a finishing for substrates such as textile fabric. Preferably, the substrates are provided in the form of a linear, a planar formation or a spatial formation.

The terms "linear formations", "planar formations" and "spatial formations" are known in the textile industry.

The composition according to the invention may also be applied as finishing for outwear to be washed.

In a fourth aspect, the invention relates to a substrate comprising at least polyacrylate (A1), wax (B) and polyacrylate (A2) as defined in the first aspect.

In one embodiment, said substrate is or has been treated by the method as defined in the third aspect.

EXAMPLES

Examples #1 to #6: Preparation of Component (I)

5 g of t-butylmethacrylate and 15 g of stearylacrylate were added to a hot mixture of 4.8 g Genapol ID 100 (fatty alcohol ethoxylate (Clariant)) and 0.4 g of cetyltrimethylammonium chloride in 10 g dipropylene glycol and 120 g water at appr. 80° C. and were dispersed by stirring. In a separate vessel, 40 g of the paraffin wax (melting range 68 to 74° C.) were melted. The above described dispersion of monomers was added to the molten paraffin wax. After 2 minutes of further dispersing the mixture was two times consequently homogenized by Manton-Gaulin homogenizer equipment (at 400 bars at 85° C.) until a stable emulsion was obtained. The temperature was kept between 75 to 80° C., and 0.2 g of 2,2'-azobis(2-methylpropionamidine)dihydrochloride initiator (Wako V-50) diluted in 1.8 g water was added and the mixture was treated for 6 hours at 75° C. under $N_2$ under a donned reflux condenser. This resulted in appr. 200 g product having a solids content of appr. 33% by weight (determined by drying at 120° C./2 h).

Similar to the process described for Example #1, other monomer combination and paraffin wax types were used to produce stable dispersions. Details are given in Table1:

TABLE 1

|  | #1 | #2 | #3 | #4 | #5 | #6 |
|---|---|---|---|---|---|---|
| t-BuMA | 2.5 |  |  | 2.5 | 1 | 2.5 |
| i-BuMA |  | 1 |  |  |  |  |
| MMA | — |  | 2.5 |  |  |  |
| SA | 7.5 |  | 7.5 | 7.5 |  |  |
| BeMA |  |  |  | 5 | 5 | 12.5 |
| LA |  | 10 |  |  |  |  |
| HEMA |  |  | 0.2 | 1.0 |  |  |
| GMA |  | 0.4 | 0.1 |  | 0.1 |  |
| HBAC |  |  |  |  | 0.1 |  |
| paraffin wax | 20 | 15 | 20 | 10 | 25 | 7.5 |

(t-BuMA = tert. Butyl methacrylate; i-BuMA = iso-butyl methacrylate; MMA = methyl methacrylate; SA = stearyl acrylate; BeMA = behenyl acrylate; LA = lauryl acrylate; HEMA = hydroxyethyl methacrylate; GMA = glycidyl methacrylate; HBAC = hydroxybutyl acrylate; paraffin wax: Sasolwax 8775)

Examples #7 and #8: Preparation of Component (II)

Example #7: Preparation of a Poly(Meth)Acrylate Dispersion Containing Perfluoroalkyl Groups According to Example 1 of EP 2 057 201

The dispersion was prepared by intensively stirring the following compounds under an inert-gas atmosphere in an autoclave equipped with stirrer, reflux condenser and internal thermometer:
60.0 g 2-perfluorohexylethyl methacrylate $C_6F_{13}C_2H_4O_2CC(CH_3)=CH_2$
22.5 g stearyl acrylate
15.5 g vinylidene chloride
1.0 g N-methoxymethyl acrylamide
1.0 g hydroxyethyl methacrylate
30.0 g dipropylene glycol
0.5 g dodecanethiol
4.0 g lauryl alcohol/16 ethylene oxide adduct
3.5 g N,N-dimethyldodecylammonium acetate
200.0 g water The emulsion was heated to 60° C. and 0.6 g of initiator 2,2'-azobis-2-amidinopropane dihydrochloride were added. The polymerization was conducted for a period of 6 h at 60° C. After the reaction, non-reacted vinyl chloride was distilled off. The resulting dispersion had a solids content of about 33%.

Example #8: Preparation of a Poly(Meth)Acrylate Dispersion Containing Perfluoro Alkyl Groups The dispersion was prepared by intensively stirring the following compounds under an inert-gas atmosphere in an autoclave equipped with stirrer, reflux condenser and internal thermometer:
60.0 g 2-perfluorohexylethyl methacrylate $C_6F_{13}C_2H_4OCOC(CH_3)=CH_2$
22.5 g stearyl acrylate
1.0 g hydroxyethyl methacrylate
30.0 g dipropylene glycol
0.5 g dodecanethiol
4.0 g lauryl alcohol/16 ethylene oxide adduct
3.5 g N,N-dimethyldodecylammonium acetate
200.0 g water The emulsion was heated to 60° C. and 0.6 g of initiator 2,2'-azobis-2-amidinopropane dihydrochloride were added. The polymerization was conducted for a period of 6 h at 60° C. After the reaction, the resulting dispersion had a solids content of about 30%.

Table 2 specifies compositions M1 to M18 according to the invention in comparison to compositions M19 and M20 which are represented by Examples #7 and #8. Compositions M1 to M18 were prepared by mixing component (I) as prepared according to Examples #1 to #7 with component (II) according to Examples #7 and #8.

TABLE 2

|  | composition (I) | composition (II) |
|---|---|---|
| M1 | 60 parts Exp #1 | 40 parts Exp #7 |
| M2 | 60 parts Exp #2 | 40 parts Exp #7 |
| M3 | 60 parts Exp #3 | 40 parts Exp #7 |
| M4 | 60 parts Exp #4 | 40 parts Exp #7 |
| M5 | 60 parts Exp #5 | 40 parts Exp #7 |
| M6 | 60 parts Exp #6 | 40 parts Exp #7 |
| M7 | 30 parts Exp #1 | 70 parts Exp #7 |
| M8 | 30 parts Exp #2 | 70 parts Exp #7 |
| M9 | 30 parts Exp #3 | 70 parts Exp #7 |
| M10 | 30 parts Exp #4 | 70 parts Exp #7 |
| M11 | 30 parts Exp #5 | 70 parts Exp #7 |
| M12 | 30 parts Exp #6 | 70 parts Exp #7 |
| M13 | 60 parts Exp #1 | 40 parts Exp #8 |
| M14 | 60 parts Exp #3 | 40 parts Exp #8 |
| M15 | 60 parts Exp #5 | 40 parts Exp #8 |
| M16 | 30 parts Exp #1 | 70 parts Exp #8 |
| M17 | 30 parts Exp #3 | 70 parts Exp #8 |
| M18 | 30 parts Exp #5 | 70 parts Exp #8 |
| M19 | none | 100 parts Exp #7 |
| M20 | none | 100 parts Exp #8 |

Application Examples

The following examples describe the treatment of textile fabric with the dispersions prepared as per compositions M1 to M20.

A woven 100% polyester fabric (100 g/m²) and a woven 100% cotton fabric (200 g/m²) were treated.

The cotton fabric was treated in a pad-mangle with a liquor containing 1 g/l acetic acid, 20 g/l of a cellulose crosslinker and 70 g/l of the dispersions M1 to M20. Typical weight pick-up of the liquor was 80 percent.

The polyester fabric was padded with liquor containing 1 g/l acetic acid, 1 g/l of a wetting agent, and 40 g/l of composition M1 to M20. Typical weight pick-up was 60 percent. After padding, the fabrics were dried at 160° C. for 3 minutes.

The finished fabrics were subjected to a water spray test as per AATCC 22-2010, ISO 4920 (EN 24920), an oil-repelling test as per AATTC Test Method 118-2002, and a water-droplet test as per AATTC Test Method 193-2005 original (initial) and after 20 wash cycles (DIN ISO 6330) at 40° C. After the washing cycles the fabrics were tumble dried before spray testing. Typical tumble drying temperature 60 to 65° C. for 30 minutes.

The results are shown in Table 3 for polyester and in Table 4 for cotton.

TABLE 3

| Polyester | | | | | | |
|---|---|---|---|---|---|---|
| M1-M20 at 40 g/l | Spray initial | 20x wash cycles | Oil repellency initial | 20x wash cycles | Water drop initial | 20x wash cycles |
| M1 | 100 | 100 | 6 | 5 | 8 | 7 |
| M2 | 100 | 90 | 6 | 5 | 8 | 7 |
| M3 | 100 | 100 | 6 | 5 | 8 | 7 |
| M4 | 100 | 90 | 6 | 5 | 8 | 7 |
| M5 | 100 | 90 | 6 | 5 | 8 | 7 |
| M6 | 100 | 90 | 6 | 5 | 8 | 7 |
| M7 | 100 | 100 | 7 | 6 | 8 | 7 |
| M8 | 100 | 90 | 6 | 6 | 8 | 8 |
| M9 | 100 | 100 | 7 | 6 | 8 | 8 |
| M10 | 100 | 90 | 6 | 6 | 8 | 8 |
| M11 | 100 | 90 | 6 | 6 | 8 | 8 |
| M12 | 100 | 90 | 6 | 6 | 8 | 8 |
| M13 | 100 | 90 | 6 | 5 | 8 | 7 |
| M14 | 100 | 100 | 6 | 5 | 8 | 7 |
| M15 | 100 | 100 | 6 | 4 | 8 | 7 |
| M16 | 100 | 90 | 7 | 6 | 8 | 8 |
| M17 | 100 | 100 | 7 | 6 | 8 | 8 |
| M18 | 100 | 100 | 6 | 6 | 8 | 8 |
| M19 | 100 | 80 | 6 | 4 | 8 | 6 |
| M20 | 100 | 70 | 6 | 3 | 8 | 5 |

TABLE 4

Cotton

| M1-M20 at 70 g/l | Spray initial | 20x wash cycles | Oil repellency initial | 20x wash cycles | Water drop initial | 20x wash cycles |
|---|---|---|---|---|---|---|
| M1 | 100 | 80 | 6 | 3 | 8 | 5 |
| M2 | 100 | 80 | 6 | 3 | 8 | 5 |
| M3 | 100 | 80 | 6 | 3 | 8 | 5 |
| M4 | 100 | 80 | 6 | 3 | 8 | 5 |
| M5 | 100 | 70 | 6 | 3 | 8 | 5 |
| M6 | 100 | 80 | 6 | 3 | 8 | 5 |
| M7 | 100 | 80 | 7 | 4 | 8 | 5 |
| M8 | 100 | 70 | 6 | 4 | 8 | 5 |
| M9 | 100 | 70 | 7 | 4 | 8 | 6 |
| M10 | 100 | 70 | 6 | 4 | 8 | 6 |
| M11 | 100 | 70 | 6 | 4 | 8 | 5 |
| M12 | 100 | 70 | 6 | 3 | 8 | 6 |
| M13 | 100 | 70 | 6 | 4 | 8 | 5 |
| M14 | 100 | 80 | 6 | 4 | 8 | 5 |
| M15 | 100 | 80 | 6 | 3 | 8 | 5 |
| M16 | 100 | 70 | 7 | 3 | 8 | 5 |
| M17 | 100 | 70 | 7 | 3 | 8 | 5 |
| M18 | 100 | 70 | 6 | 3 | 8 | 5 |
| M19 | 100 | 70 | 6 | 3 | 8 | 4 |
| M20 | 100 | 50 | 6 | 1 | 8 | 3 |

The examples showed on polyester even at low add-on very good water-, oil- and alcohol-repellent effects (from the water-droplet test) even after washing. For cotton very good initial effects were achieved.

By addition of an additional crosslinker e.g. Cassurit FF to the application bath, the durability of the water-, oil- and alcohol repellent effect on polyester, but especially on cotton fabric, could further be improved. The results are shown in Table 5 for cotton and in Table 6 for polyester.

TABLE 5

Cotton

| M1-M20 (70 g/l) plus crosslinker Cassurit FF (10 g/l) | Spray initial | 20x wash cycles | Oil repellency initial | 20x wash cycles | Water drop initial | 20x wash cycles |
|---|---|---|---|---|---|---|
| M1 | 100 | 90 | 6 | 4 | 8 | 7 |
| M2 | 100 | 100 | 6 | 4 | 8 | 7 |
| M3 | 100 | 100 | 6 | 4 | 8 | 7 |
| M4 | 100 | 90 | 6 | 4 | 8 | 7 |
| M5 | 100 | 90 | 6 | 4 | 8 | 7 |
| M6 | 100 | 90 | 6 | 4 | 8 | 7 |
| M7 | 100 | 90 | 7 | 5 | 8 | 7 |
| M8 | 100 | 90 | 6 | 6 | 8 | 8 |
| M9 | 100 | 90 | 7 | 6 | 8 | 8 |
| M10 | 100 | 90 | 6 | 5 | 8 | 8 |
| M11 | 100 | 80 | 6 | 5 | 8 | 8 |
| M12 | 100 | 90 | 6 | 5 | 8 | 8 |
| M13 | 100 | 90 | 6 | 5 | 8 | 7 |
| M14 | 100 | 90 | 6 | 4 | 8 | 7 |
| M15 | 100 | 90 | 6 | 4 | 8 | 7 |
| M16 | 100 | 80 | 7 | 5 | 8 | 8 |
| M17 | 100 | 90 | 7 | 5 | 8 | 8 |
| M18 | 100 | 90 | 6 | 5 | 8 | 8 |
| M19 | 100 | 80 | 6 | 4 | 8 | 6 |
| M20 | 100 | 70 | 6 | 3 | 8 | 5 |

TABLE 6

Polyester

| M1-M2 (40 g/l) plus Cassurit FF (5 g/l) | Spray initial | 20x wash cycles | Oil repellency initial | 20x wash cycles | Water drop initial | 20x wash cycles |
|---|---|---|---|---|---|---|
| M1 | 100 | 100 | 6 | 5 | 8 | 7 |
| M2 | 100 | 100 | 6 | 5 | 8 | 7 |
| M3 | 100 | 100 | 6 | 5 | 8 | 7 |
| M4 | 100 | 100 | 6 | 5 | 8 | 7 |
| M5 | 100 | 100 | 6 | 5 | 8 | 7 |
| M6 | 100 | 90 | 6 | 5 | 8 | 7 |
| M7 | 100 | 100 | 7 | 6 | 8 | 7 |
| M8 | 100 | 90 | 6 | 6 | 8 | 8 |
| M9 | 100 | 100 | 7 | 6 | 8 | 8 |
| M10 | 100 | 100 | 6 | 6 | 8 | 8 |
| M11 | 100 | 100 | 6 | 6 | 8 | 8 |
| M12 | 100 | 100 | 6 | 6 | 8 | 8 |
| M13 | 100 | 100 | 6 | 5 | 8 | 7 |
| M14 | 100 | 100 | 6 | 5 | 8 | 7 |
| M15 | 100 | 100 | 6 | 4 | 8 | 7 |
| M16 | 100 | 90 | 7 | 6 | 8 | 8 |
| M17 | 100 | 100 | 7 | 6 | 8 | 8 |
| M18 | 100 | 100 | 6 | 6 | 8 | 8 |
| M19 | 100 | 80 | 6 | 4 | 8 | 6 |
| M20 | 100 | 70 | 6 | 3 | 8 | 5 |

Similar improvement of the durability of the water-, oil- and alcohol-repellent effect was achieved by adding 20 g/l of a melamine resin formulation (e.g. Cerol EX or Freepel 1225) to the application bath.

Despite the fact that fabrics treated with formulations M1 to M18 offer already a good hand feeling, it is sometimes desirable to give the treated fabric a special extra soft hand feeling. This can be achieved by adding in addition to the application bath a softener formulation based on an organic polysiloxane such as Ceraperm SFC. The results are shown for polyester in Table 7:

TABLE 7

Polyester

| M1-M20 (40 g/l) plus Cassurit FF (5 g/l) + Ceraperm SFC (15 g/l) | Spray initial | 20x wash cycles | Oil repellency initial | 20x wash cycles | Water drop initial | 20x wash cycles |
|---|---|---|---|---|---|---|
| M1 | 100 | 90 | 6 | 4 | 8 | 7 |
| M2 | 100 | 100 | 6 | 3 | 8 | 7 |
| M3 | 100 | 100 | 6 | 4 | 8 | 7 |
| M4 | 100 | 90 | 6 | 4 | 8 | 7 |
| M5 | 100 | 90 | 6 | 4 | 8 | 7 |
| M6 | 100 | 90 | 6 | 4 | 8 | 7 |
| M7 | 100 | 90 | 7 | 5 | 8 | 7 |
| M8 | 100 | 90 | 6 | 5 | 8 | 8 |
| M9 | 100 | 90 | 7 | 4 | 8 | 8 |
| M10 | 100 | 90 | 6 | 5 | 8 | 8 |
| M11 | 100 | 90 | 6 | 5 | 8 | 8 |
| M12 | 100 | 90 | 6 | 5 | 8 | 8 |
| M13 | 100 | 90 | 6 | 4 | 8 | 7 |
| M14 | 100 | 90 | 6 | 4 | 8 | 7 |
| M15 | 100 | 90 | 6 | 3 | 8 | 7 |
| M16 | 100 | 90 | 7 | 5 | 8 | 8 |
| M17 | 100 | 90 | 7 | 5 | 8 | 8 |
| M18 | 100 | 90 | 6 | 5 | 8 | 8 |
| M19 | 100 | 70 | 6 | 3 | 8 | 6 |
| M20 | 100 | 50 | 6 | 2 | 8 | 5 |

Besides a very soft comfortable hand feeling, very good initial and durable water repellency is achieved.

The invention claimed is:

1. A composition, comprising a first component (I) comprising polyacrylate (A1), a wax (B), and optionally one or more of (C) to (E):
   (C) is a blocked isocyanate;
   (D) is an organic polysiloxane;
   (E) is a melamine resin; and a second component (II) comprising a polyacrylate (A2), wherein
   polyacrylate (A1) comprises moieties derived from (meth)acrylic acid ester monomers (M1) and (M2), and optionally (M3), $$CH_2=CR^3COO—R^1 \quad (M1)$$

$$CH_2=CR^3COO—R^2 \quad (M2)$$

$$CH_2=CR^3—X—R^4; \quad (M3)$$

wherein $R^1$ is a alcohol moiety in monomer (M1) containing from 1 to 8 carbon atoms;
   $R^2$ is an alcohol moiety in monomer (M2) containing from 9 to 40 carbon atoms;
   $R^3$ is independently selected from the group consisting of H, $CH_3$, and $C_2H_5$;
   X is COO or CONH;
   $R^4$ is glycidyl or $CH_2(CH_2)_n—OR^5$, wherein n is an integer in an range of from 1 to 10 and
   $R^5$ is H or a residue containing from 1 to 6 carbon atoms; and
   polyacrylate (A2) is a fluorine-containing polyacrylate;
   wherein the composition is based on water and/or an organic solvent.

2. The composition of claim 1, wherein one or more of (C) to (E) is present.

3. The composition according to claim 1, wherein $R^1$ contains from 1 to 6 carbon atoms and $R^2$ contains from 12 to 40 carbon atoms.

4. The composition according to claim 1, wherein $R^1$ is branched or unbranched or cyclic $C_1$ to $C_6$ alkyl and $R^2$ is branched or unbranched or cyclic $C_{12}$ to $C_{40}$ alkyl.

5. The composition according to claim 1,
   wherein
   $R^1$ is selected from one or more of the group consisting of methyl, ethyl, n-propyl, iso-propyl, n-iso-butyl, sec-butyl, tert-butyl, n-pentyl and isomers thereof, n-hexyl and isomers thereof, cyclopropyl, cyclobutyl, cyclopentyl, and cyclohexyl; and
   $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, and n-triacontyl (myricyl) and isomers thereof.

6. The composition according to claim 1, wherein component (A1) comprises from 5 to 45% by weight of monomer (M1) and from 55 to 95% by weight of monomer (M2) based on the total amount of (A1) (=100% by weight).

7. The composition according to claim 1, wherein component (A1) comprises from 5 to 44% by weight of monomer (M1) and from 55 to 94% bye weight of monomer (M2) and 0.1 to 20% by weight of (M3) based on the total amount of (A1) (=100% by weight).

8. The composition according to claim 1, wherein wax (B) has a melting point in a range of from 50 to 130° C.

9. The composition according to claim 1, wherein wax (B) has a melting point in a range of from 60 to 90° C.

10. The composition according to claim 1, wherein wax (B) is a paraffin wax.

11. The composition according to claim 1, wherein the first component (I) comprises from
    10 to 90% by weight of (A1);
    10 to 90% by weight of (B);
    0 to 40% by weight of a blocked isocyanate (C);
    0 to 40% by weight of an organic polysiloxane (D);
    0 to 40% by weight of a melamine resin (E);
    based on the total amount of the first component (I) (=100% by weight); and
    wherein the second component (II) comprises from 10 to 100% by weight of (A2) based on the total weight of the second component (II).

12. The composition of claim 1, wherein polyacrylate (A2) of the second component (II) comprises moieties derived from (meth)acrylic acid ester monomer (M4):

$$CH_2=CR^6COO—Y—R_F, \text{ wherein} \quad (M4)$$

$R_F$—Y is an alcohol moiety in (meth)acrylate monomer (M4), wherein
    Y is —$(CH_2)_m$—, wherein is an integer in a range of from 1 to 10; and
    $R_F$ is $C_xF_{2x+1}$, wherein x is an integer in a range of from 1 to 12;
    $R_6$ is selected from the group consisting of H, $CH_3$, Cl, and F.

13. The composition according to claim 12, wherein polyacrylate (A2) further comprises one or more of monomers (M3), (V1) and/or (V2), wherein (V1) is vinyl chloride and (V2) is vinylidene chloride.

14. The composition of claim 1, wherein the composition comprises from 5 to 90% by weight of the first component (I) and from 90 to 5% by weight of the second component (II), based on the total weight of the composition (=100% by weight).

15. The composition of claim 1, wherein the composition comprises from 10 to 90% by weight of first component (I) and from 90 to 10% by weight of second component (II), based on the total amount of components (I) and (H) (=100% by weight).

16. The composition of claim 1, wherein the solids content of the composition is in a range of from 1 to 60% by weight based on the total weight of the composition (=100% by weight).

17. A method of making the composition according to claim 1, comprising the following steps:
    (C1) homogenizing a mixture comprising monomers (M1) and (M2), and wax (B), And water and/or an organic solvent;
    (C2) polymerizing the mixture obtained in (C1) to afford the first component (I); and (C3):
    (C3) mixing the first component (I) with the second component (II).

18. A method of treating a substrate, comprising (S1):
    (S1) contacting the substrate with the composition according to claim 1.

19. The method according to claim 18, wherein the substrate is in the form of a linear formation optionally thread and, yarn, in the form of a planar formation optionally fabric, knitted fabric, knotted fabric, non-woven fabric, felt, or in the form of a spatial formation optionally hose and outwear; or wherein the substrate is a textile, fiber, fabric, paper, nonwoven, leather, or a combination of two or more thereof.

20. A product comprising the composition according to claim 1 in or as a finishing for any textile in the form of a linear formation optionally thread and yarn, in the form of a planar formation optionally fabric, knitted fabric, knotted fabric, non-woven fabric, felt, or in the form of a spatial formation optionally hose and outwear.

21. A product comprising the composition according to claim 1, wherein the component (B) comprises a wax which comprises n-paraffins in an amount of from 75 to 95% by weight and one or more of isoparaffins, cycloparaffins or aromatic compounds in an amount of from 5 to 25% by weight, based on the total amount of the wax, wherein the n-paraffins have from 20 to 60 carbon atoms, optionally wherein the n-paraffins have a molecular weight of from 300 to 600; in or as a finishing for any textile in the form of a linear formation optionally thread and yarn, in the form of a planar formation optionally fabric, knitted fabric, knotted fabric, non-woven fabric, felt, or in the form of a spatial, formation optionally hose and outwear.

* * * * *